Patented Jan. 5, 1954

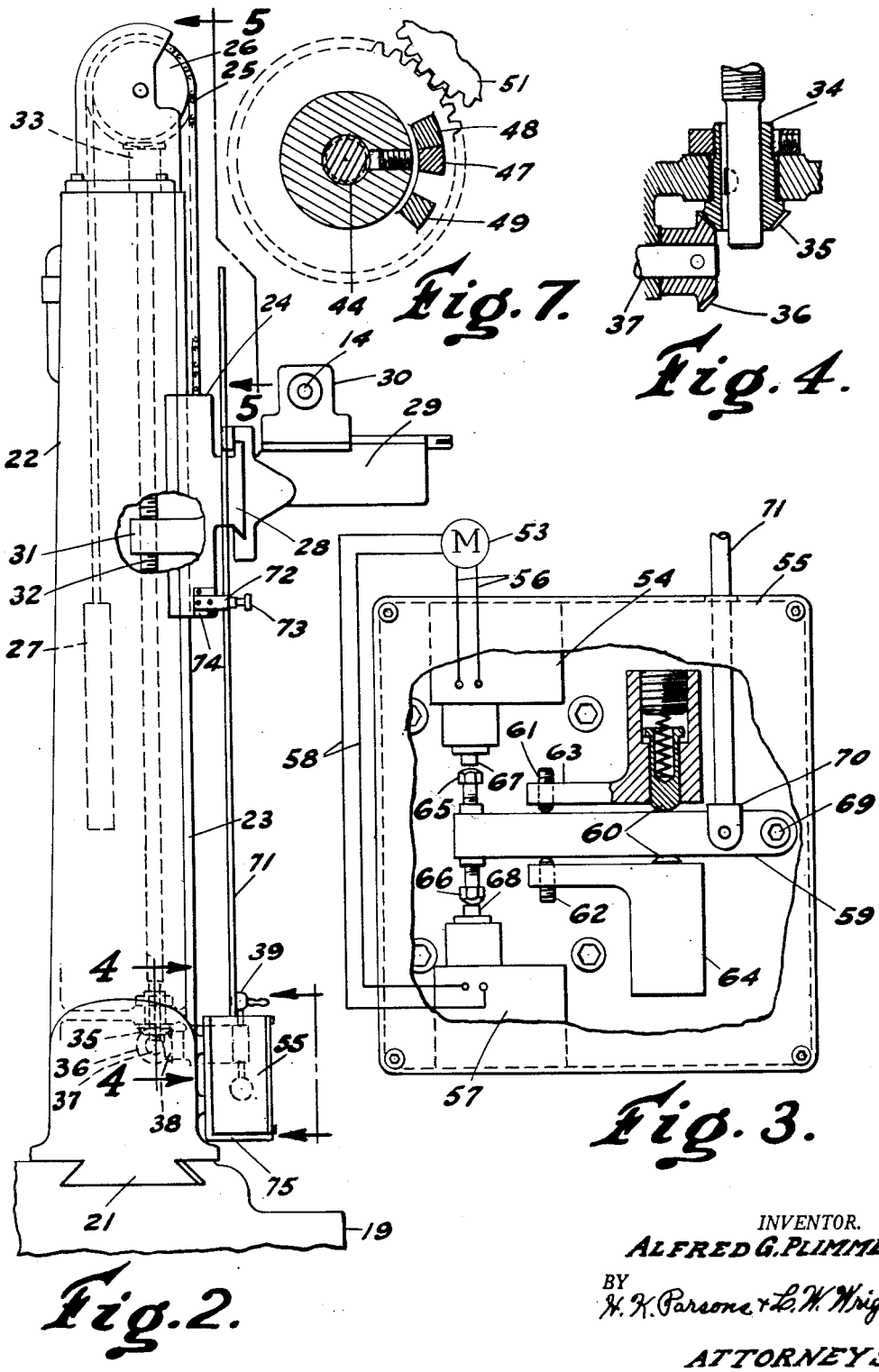

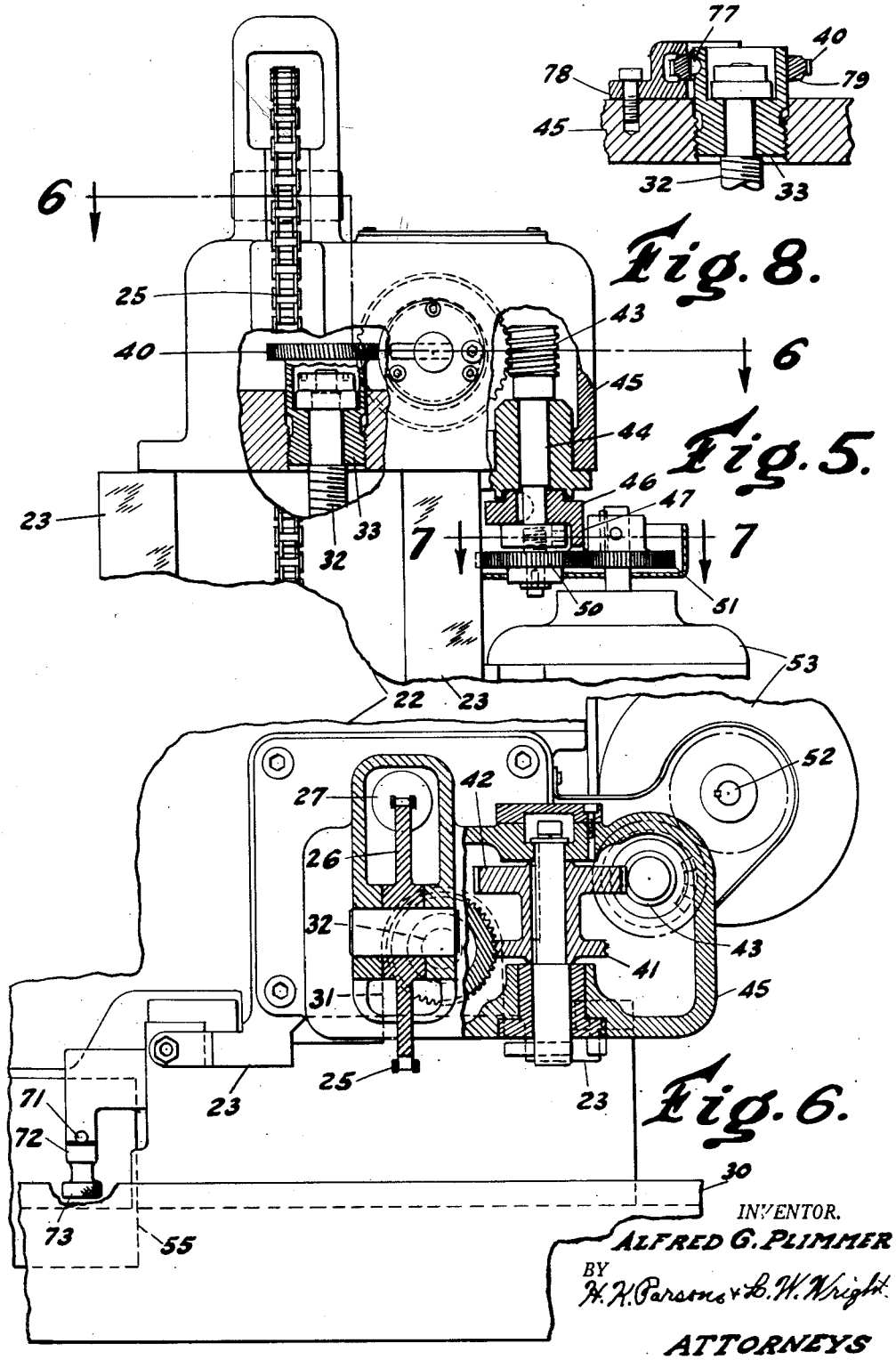

2,664,787

UNITED STATES PATENT OFFICE 2,664,787

THERMAL COMPENSATOR

Alfred G. Plimmer, Cincinnati, Ohio, assignor to The Cincinnati Milling Machine Co., Cincinnati, Ohio, a corporation of Ohio Application February 16, 1952, Serial No. 271,898

4 Claims. (Cl. 90—13)

This invention relates to improvements in machine tools and has particular reference to a mechanism automatically to compensate for variance in relationship of the parts of a machine tool resulting from changes in thermal or temperature conditions during operation thereof.

It has long been a recognized fact in connection with the utilization of milling machines, grinding machines, and like precision machine tools, that during the course of its production run, as well as when starting up for use such a machine which has been shut down for an appreciable period, or over night, that consideration must be given to the fact that such machines, built of cast iron or like expansible and contractable material are subject to appreciable variation in relative position of the parts due to different thermal or temperature conditions. Ordinarily, this necessitates various manual adjustments and intermittent checkings to prevent production of oversized or undersized work pieces depending on temperature conditions since a low temperature either of the area in which the machine is situated or due to the fact that it has not been in operation will cause a contraction or shrinkage in the relationship of the parts while the heating up of the machine, such as is normal during a day's production run or even to surrounding temperature increases will cause expansions, varying the relationship of the parts. This is particularly true in the case of large machines such as shown, for example, in the accompanying drawing which may run 18 to 20 feet or more in height and are proportionally dimensioned.

A further problem to be coped with in connection with machines such as that illustrated in Figure 1 is maintenance of the relative positional relationship between the contact points of the pattern following tracer 14 and the cutter 13 as respects the pattern and work piece. In this instance, due to the inherent structure of the machine the path followed by the cutter 13 will correspond to the path dictated by the tracer 14, but if expansion or contraction of the column 23, for example, is not compensated for there will be a positional variation which will destroy the accuracy of reproduction in that the cutter originally set up to produce a configuration in definite relation to a determined edge or reference point of the work piece will form a replica displaced with respect to the predetermined reference point, being displaced downwardly as the column expands or bodily upwardly as the column contracts in the absence of compensatory adjustment.

It is, therefore, one of the objects of the present invention to provide an improved mechanism for utilization in connection with machine tools or the like which will compensate automatically for the aforesaid thermal or temperature variations and insure greater dimensional and positional uniformity of the product of said machines, particularly in connection with continuous operation thereof.

A further object of the invention is the provision of an improved automatic power operating mechanism for maintaining constant the relationship of selected portions of a machine tool irrespective of relative expansion or contraction effects in such tool.

A further object of the invention is the provision of an improved temperature expansion compensating mechanism which may be readily applied to and utilized in conjunction with existing machine tools.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2 is an enlarged view of the auxiliary column portion of the machine viewed as indicated by the line 2—2 in Figure 1.

Figure 3 is an enlarged view of the switch control mechanism in the direction indicated by the arrows 3—3 of Figure 2.

Figure 4 is a fragmentary sectional view on the line 4—4 of Figure 2.

Figure 5 is a section on the line 5—5 of Figure 2.

Figure 6 is a horizontal section on the line 6—6 of Figure 5, and

Figure 7 is a detail horizontal section on the line 7—7 of Figure 5.

Figure 8 is an enlarged section of a portion of the drive shown in Figure 5.

Figure 1:
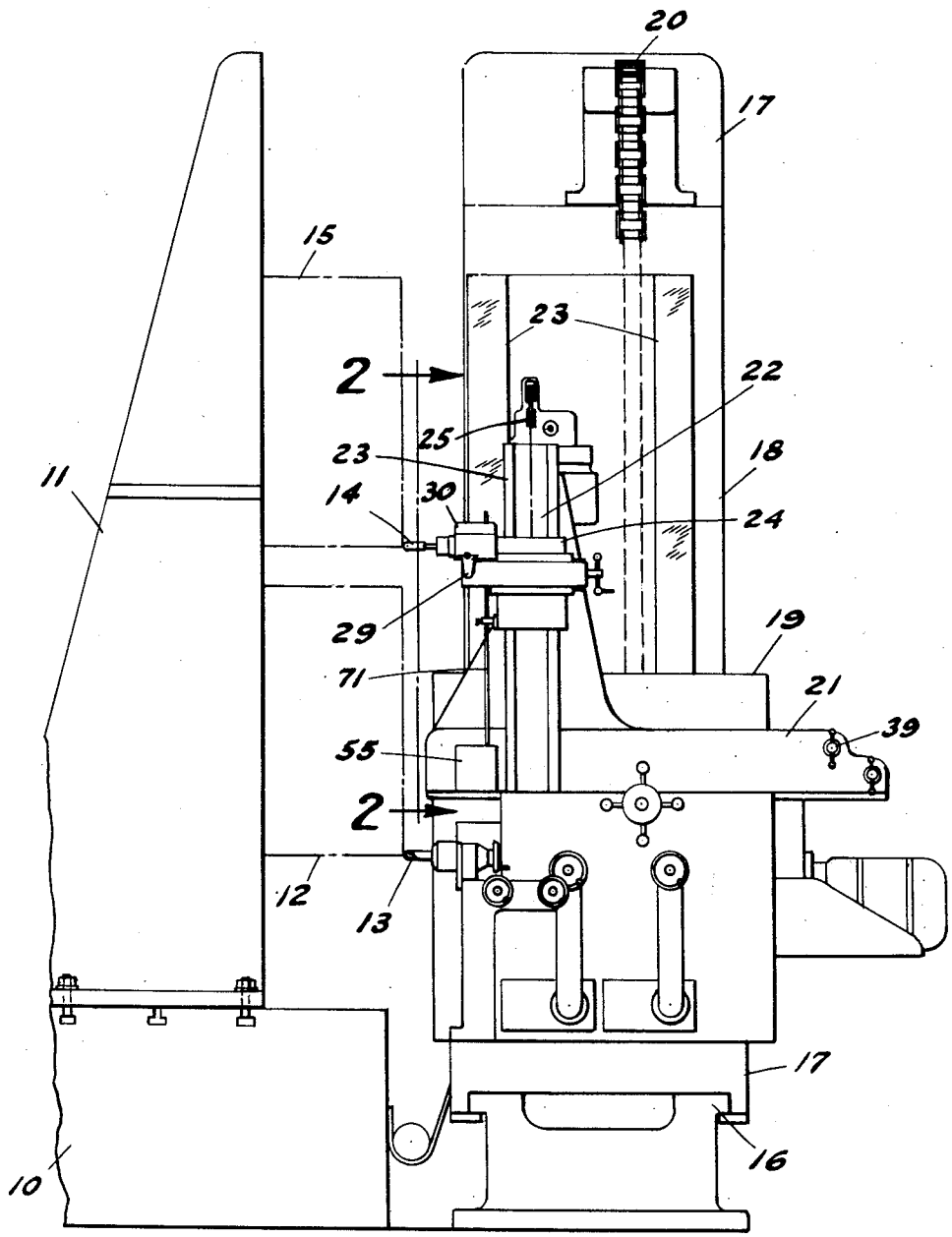
Figure 1 is an end elevation of an automatic contouring machine embodying the present invention.

In the drawings the numeral 10 designates the bed of an automatic contouring machine provided with the work holding bed plate 11 shown as supporting the work piece 12 to be operated on by the cutter 13 under the control of tracer 14 following the pattern 15. The bed is provided with the longitudinally extending ways 16 for the sliding column 17 which, in turn, is provided with ways 18 for the main vertical slide 19. A counterweight, not shown, is coupled by chain 20 with the slide 19 for facilitating free movement thereof under control of the tracer 14. Mounted on the slide 19 is the transversely adjustable arm or slide 21, bearing the auxiliary column 22 having ways 23 supporting the tracer slide 24. A counterbalance chain 25 extending over the pulley 26 bears counterweight 27, exerting a balancing force against the slide 24 to facilitate its free movement. The slide 24 is, in turn, provided with ways 28 for the cross slide 29 which mounts the tracer head 30 for tracer 14.

The slide 24 is provided with the rearwardly extending lug 31 engaging the elevating screw 32 having its upper end swiveled in the adjustable sleeve nut 33 and its lower end splined in the hub 34 of the bevel gear 35. This gear meshes with gear 36 on shaft 37, coupled by gearing 38 to the pilot wheel 39 on the face of the slide 21. Rotation of the screw by pilot wheel 39 serves to effect vertical relative adjustment between the cutter 13 and the tracer contactor 14 for determining the correct relative positional adjustment of these parts.

Carried by the upper end of the sleeve nut 33 is a gear 40 meshing with gear 41 of a gear couplet including a second gear 42 meshing with worm 43 on the shaft 44 journaled in the head 45 at the top of the column 22. A collar 46 keyed to the shaft 44 has a lug 47 fitting between the abutments 48 and 49 on gear 50 which is rotatably supported by the shaft 44. This gear, in turn, meshes with gear 51 keyed on the shaft 52 of the drive motor 53 carried by the column 22. It will thus be seen that rotation of motor 53 in one direction or the other, through the reduction gearing shown, will impart a slow rotational movement to the nut 33 to move the nut upwardly or downwardly with respect to the head 45 of the column, thus imparting a minute incremental adjustment of the tracer slide 24.

The actuation of the motor in one direction for driving the gearing to effect an upward adjustment of the tracer slide is controlled by the switch 54 contained in the switch box 55 mounted on the cross slide 21 and coupled with the motor by the leads 56. Actuation of the motor in the opposite direction is controlled by switch 57 likewise contained within the unit 55 and coupled with the motor by the leads 58. Pivoted within the switch box is an activator for control of activation of the motor in the form of a trip lever 59 normally resiliently retained in a centralized position by the spring pressed plungers 60 and capable of limited movement in either direction to an extent determined by the adjustable abutment screws 61 and 62 carried by the plunger brackets 63 and 64. Terminally, this lever is provided with the adjustable contacts 65 and 66 for cooperation with the switch contacts 67 and 68, it being understood that the control current connections for the motor 53 may be effected either directly electrically as by contact of the element 65—67, for example, or that the electrical circuit may be completable entirely within the switch boxes 54 and 57, the contacts 67 and 68 being sensitively responsive to slight reactions of the lever 59 thereagainst.

Pivotally connected to the lever 59 near its pivot support 69 is the yolk or clevice 70 carried by rod or shifter 71. As indicated, the lever connection arrangement is such that the contacts 65—66 will have at least a five to one amplified movement over the amount of movement imparted to the control rod 71, but it will be understood that the linkage connections may be such as to give any desired degree of amplification of movement according to the desired sensitivity of the device. The rod 71 extends upwardly in a direction parallel with the column 22 through the yoke or guide 72 on slide 24, this guide being provided with a screw 73 effective to clamp the rod firmly to the slide subsequent to any screw effected vertical adjustment of the slide. When clamped, any tendency toward movement of the slide 24 due to expansion or contraction of the column will move the rod or shifter 71, reacting to shift or rock the contact lever 59 to energize either the switch element 54 or the switch element 57. Attention is invited to the fact that the bracket 72 is mounted on a suitable insulation block 74 and the switch box 55 on an insulation block 75 to reduce to a minimum any temperature transferrence from the machine itself to these control elements. Additionally, the control rod or bar may be formed of steel, invar metal, quartz, or other material having minimum temperature sensitivity as respects expansion or contraction under normal operating conditions.

The structure just described is particularly advantageous for utilization in connection with body die or like large profiling or contouring machines in which it is essential that the form reproduced in the work piece 12 be as nearly as possible identical to limits of the nature of a thousandth of an inch as produced by the operation of the tool 13 with the corresponding dimensions of the pattern 15 followed by the tracer 14. This accuracy must be maintained throughout the continuous production operation of the machine which may be from 12 to substantially 24 hours a day. The accurate automatic maintenance of the proper relationship between the controlling tracer 14 and the cutter 13 is of particular importance on such machines due to the size of the superimposed pattern and work piece structures and the difficulty of accurate checking of the relative measurements of the parts during the machining operation. By utilization of the present invention, the clamp 73 may be loosened, the work piece and tool brought into proper relationship one with the other and the tracer supporting slide adjusted by means of the hand wheel 39 for proper engagement with the pattern. During this adjustment, the yoke or guide 72 will slide longitudinally on the compensator rod or bar 71, while when the parts have been moved into desired relationship the clamp screw 73 is tightened, securely locking the selected point of the rod within the yoke and in fixed relation to the tracer head slide 24 with the lever 59 held in its centralized position by the plungers 60.

The device having been thus placed in operative condition, should heating up of the machine cause an expansion in the column 22 or otherwise throughout the machine even of the nature of .001", this expansion will pull upwardly on the rod 71 rocking the lever 59 and through the contact 65 effecting energization of motor 53 in the correct direction to react through the sensitive reduction transmission shown imparting a fine adjustment to the nut 33. This reaction will vary the suspension of the screw 32 in the column 22, shifting the lug 31 and thus the slide 24 downwardly to the extent necessary to compensate for such expansion effected movement, restoring the control lever 59 to its neutral position. On the other hand, a cooling of the parts, as for example when the machine is shut down or standing idle for an appreciable period, will effect the opposite actuation of the lever 59 and reversal of operation of the motor 53 to again restore the desired spacing attendant upon moving of lever 59 back to a neutral position.

It will be understood that the adjustments to be effected of the member 33 are ordinarily relatively slight in amount and that the gear 40 may slide vertically to the necessary extent relative to the gear 41. In the event that greater movement of the member 33 is contemplated, the gear 40 may be formed separately from said member and connected to it by a key or spline as shown at 77 in Figure 8. A bracket 78 carried by the member 45 and in spanning engagement with the hub 79 of gear 40 serving to maintain the gear in fixed relation to the remainder of the drive train carried by the head 45 while permitting axial or longitudinal relative sliding movements of the driving member and the driven threaded member 33.

It will be evident that the present invention contemplates basically the utilization of a spacing determinator which is preferably fixed to one element of a machine tool and adjustably associated with another element of the tool in which there is an adjuster for determining the relative position of these elements, which is preferably power operated, together with means under the control of the spacing determinator for determining and automatically effecting the operation of this adjuster.

It will be evident that while in the preferred embodiment of the invention illustrated in the drawings the adjuster mechanism included an electric motor and switch elements for determining the operation of the motor that alternatively use could be made of hydraulic or other motive means for actuation of the adjuster and that the controls for the actuator may likewise be either electrical or hydraulic in nature or that in some instances pawl and ratchet or other mechanical impulse transmitting means may be utilized to effect the desired relative adjustment of the elements of the machine.

What is claimed is:

1. An expansion compensator for machine tools including a pair of relatively adjustable parts comprising a support and a slide movable on the support, means adjustably connecting the slide and support including a nut carried by the slide and a second nut carried by the support, a connecting member having a first threaded portion for engagement with the nut on the slide and a second threaded portion for engagement with the nut on the support, a first adjusting mechanism for effecting relative rotary movement of the threaded portion of said member and the slide nut, a second adjusting mechanism for effecting relative rotary movement of the other threaded portion of the member and the support nut, and a swivel connection between the respective threaded portions to permit their independent relative rotary movement.

2. An expansion compensator for machine tools including a pair of relatively adjustable parts comprising a support and a slide movable on the support, means adjustably connecting the slide and support including a nut carried by the slide and a second nut carried by the support, a connecting member having a first threaded portion for engagement with the nut on the slide and a second threaded portion for engagement with the nut on the support, a first adjusting mechanism for effecting relative rotary movement of the threaded portion of said member and the slide nut, a second adjusting mechanism for effecting relative rotary movement of the other threaded portion of the member and the support nut, a swivel connection between the respective threaded portions to permit their independent relative rotary movement, power means coupled with one of said adjusting mechanisms for imparting rotary movement thereto, an activator for said power means carried by one of the two first-named parts and a shifter carried by the other of said parts and coupled with the activator for movement of the latter upon relative movement of the parts.

3. A machine tool including a support, a column rising from the support, a slide movable on the column, a sleeve adjustably threaded into the column, a slide adjusting screw swiveled to the sleeve and depending therefrom, the slide having a nut portion interengaged with the screw, means for rotating the screw to effect positional adjustment of the slide with respect to the column, a power actuator coupled with the sleeve to effect rotation thereof whereby the screw is axially adjusted with respect to the column, an activator for said power means carried by the support, and an actuating member for the activator comprising a shifter having one end secured to the activator and the opposite end secured to the slide whereby movement of the slide will react on the activator to activate the power adjusting means for the sleeve.

4. A machine tool including a support, a column rising from the support, a slide movable on the column, a sleeve adjustably threaded into the column, a slide adjusting screw swiveled to the sleeve and depending therefrom, the slide having a nut portion interengaged with the screw, means for rotating the screw to effect positional adjustment of the slide with respect to the column, a power actuator coupled with the sleeve to effect rotation thereof whereby the screw is axially adjusted with respect to the column, an activator for said power means carried by the support, an actuating member for the activator comprising a shifter having one end secured to the activator and the opposite end secured to the slide whereby movement of the slide will react on the activator to activate the power adjusting means for the sleeve, and means thermally insulating the shifter as respects the slide and the support to minimize thermal reaction effects as respects the shifter.

ALFRED G. PLIMMER.

References Cited in the file of this patent

UNITED STATES PATENTS

| Number | Name | Date |
|---|---|---|
| 1,454,777 | Walker | May 8, 1923 |
| 2,116,593 | Bouvier et al. | May 10, 1938 |
| 2,369,598 | Misset | Feb. 13, 1945 |
| 2,442,949 | Fischer | June 8, 1948 |
| 2,505,812 | Theimer | May 2, 1950 |